(12) United States Patent
McGrath

(10) Patent No.: US 7,937,456 B2
(45) Date of Patent: May 3, 2011

(54) CONFIGURATION PROFILING FOR REMOTE CLIENTS

(75) Inventor: Michael P. McGrath, Chicago, IL (US)

(73) Assignee: Red Hat, Inc., Raleigh, NC (US)

( * ) Notice: Subject to any disclaimer, the term of this patent is extended or adjusted under 35 U.S.C. 154(b) by 393 days.

(21) Appl. No.: 12/016,471

(22) Filed: Jan. 18, 2008

(65) Prior Publication Data

US 2009/0187642 A1 Jul. 23, 2009

(51) Int. Cl.
*G06F 15/177* (2006.01)
(52) U.S. Cl. .......................... 709/220; 710/19
(58) Field of Classification Search .................. 709/220; 710/19
See application file for complete search history.

(56) References Cited

U.S. PATENT DOCUMENTS

2005/0132357 A1* 6/2005 Shell et al. ..................... 717/174

OTHER PUBLICATIONS

Author: Ubuntu Date: Oct. 11, 2007 http://web.archive.org/web/20071212234610/www.ubuntuhcl.org/pub/index.php.*
Author: HawareLister Date: Jun. 29, 2007 http://web.archive.org/web/20070629135831/http://ezix.org/project/wiki/HardwareLiSter.*
"UbuntuHCL.org: The Comprehensive Ubuntu Linux Hardware Database," http://hwdb.ubuntu.com/ , Home Page (last visited Jan. 18, 2008).
Red Hat Command Center 3.18, Check Reference, Red Hat, Inc., 2007, 178 pages.
Red Hat Command Center, Users Guide 3.18, Red Hat, Inc., 2007, 318 pages.
Red Hat Command Center, Release Notes 3.18, Red Hat, Inc., 2007, 7 pages.
Red Hat Command Center 3.18, Setup and Installation Guide, Red Hat, Inc., 2007, 33 pages.
Mmcgrath—Metrics, http://mmcgrath.livejournal.com/742.html, Jan. 30, 2007, 1 page.

\* cited by examiner

*Primary Examiner* — Joseph E Avellino
*Assistant Examiner* — Marshall McLeod
(74) *Attorney, Agent, or Firm* — Blakely, Sokoloff, Taylor & Zafman LLP

(57) ABSTRACT

A method and system for a securely gathering and sharing metrics on configurations of client systems. In one embodiment, a system includes a client that determines which components are installed in the client. The client receives, from a user, rating information for individual components in the client, and generates a configuration profile. The configuration profile includes a unique identifier of the client such as a universally unique identifier (UUID), rating information received from the user, and component information for which rating information was received. The configuration profile is sent to a server that stores the configuration profile in a database. The server can send to the client, in response to receiving the configuration profile, received rating information provided from other users having types of components in common with components provided in the configuration profile.

22 Claims, 5 Drawing Sheets

CONFIGURATION PROFILING FOR REMOTE CLIENTS

TECHNICAL FIELD

Embodiments of the present invention relate to managing networked computers and, more specifically, to manage configurations of networked computers and appliances.

BACKGROUND

Networked computers are used to transmit and fetch information to and from local sources (e.g., computers used in a business) and remote sources (e.g., enterprise services offered over the internet). The networked computers are typically owned and controlled by a wide variety of businesses, educational institutions, and individual users. The users of the networked computers can have a wide range of experience from beginner to expert levels, and can have differing levels of expertise (or lack thereof) within various categories of computer technologies. The networked computers themselves have a wide variety of configurations of both hardware and software because of the differing requirements of the owners and users of the computers and availability of hardware and software components to provision or upgrade the computer systems. Furthermore, even computers having common operating systems often have various revision levels of both application and operating systems.

Computers are often purchased from a wide variety of sources, which increases diversity of configurations. Even computers with similar ratings purchased at the same time from a vendor can have various types of hardware components installed. The drivers for these devices will differ as well, and might not work when, for example, a new operating system (or operating system upgrade) is installed. Users (beginners, novices, and experts) are tasked with the formidable challenges of, for example, determining which particular devices work in various computer systems, and finding solutions for compatibility problems, and (perhaps most importantly) avoiding the problems that come with upgrading.

Furthermore, developers are tasked with designing hardware and writing software that will work with a wide variety of computer systems having differing configurations. While developers are successful in designing products that will work with some computer systems, it is evident from anecdotal and personal experience that oftentimes compatibility problems result despite the best efforts of developers.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
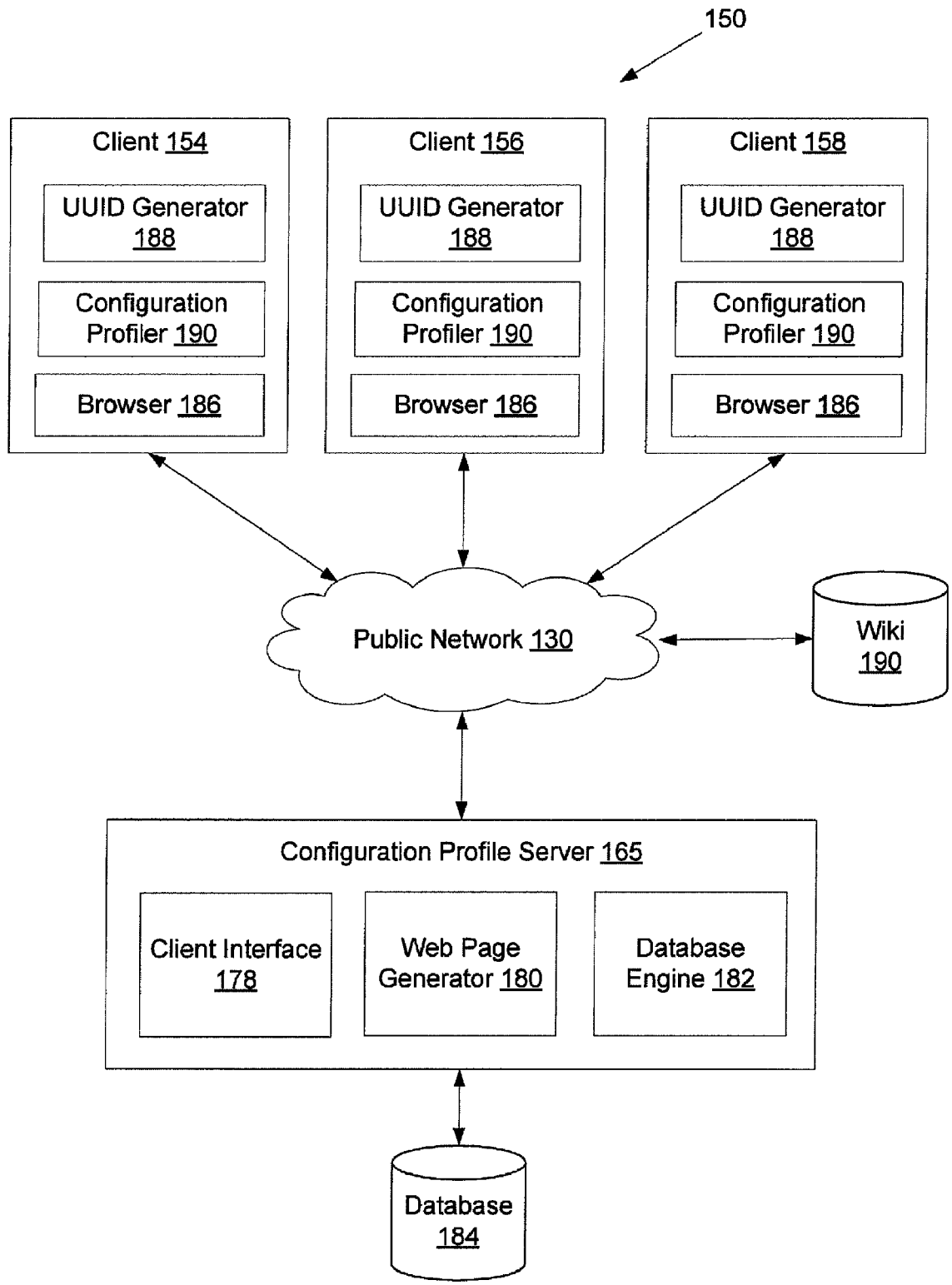
FIG. 1 illustrates an exemplary network architecture in which embodiments of the present invention may operate.

Described herein is a method and system for a securely gathering and sharing metrics on client systems. In one embodiment, the system includes a client that determines which hardware components are installed in the client. The client receives, from a user, rating information for individual components in the client, and generates a configuration profile. The configuration profile may include, for example, a universally unique identifier (UUID), rating information received from the user, and component information for which rating information was received. The configuration profile is sent to a server that stores the configuration profile in a database. The server can send to the client, in response to receiving the configuration profile, received rating information provided from other users having components in common with components provided in the configuration profile.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system, apparatus, and method for securely gathering configuration metrics of remote clients. A client-side application collects information concerning the configuration of the client machine and submits the profile information to a server. The profile information may specify what kinds of components (and version numbers) are installed in a system. The profile information optionally includes a snapshot of software on the system.

The profile information is selected such that the client system cannot be identified by the profile information. Instead, the client computer is associated with a randomly generated identifier so that the client computer can be uniquely associated with the profile information. The randomly generated identifier can be a UUID (universally unique identifier) that is generated in software (such as the UUID of the operating system kernel) and/or is hardware-based (such as a one-way hash function of an electronic serial number of the microprocessor). The identifier can be generated by the client-side application and transmitted to the server, or generated by the server and transmitted to the client-side application.

The server-side software for the information profile system may include a database that is used to track the profile information supplied by the client-side application. The database can be used to track various types and versions of hardware, firmware, and/or software components of the client, the type of processor of the client system, the type of operating system running, which version of the operating system kernel is running, how much memory is available, security settings, and the like. Each profile is stored in the database individually so that each profile ratings can be accessed. A web interface is provided that allows users (e.g., system developers) to perform queries on the data in the information profile database.

FIG. 1 illustrates an exemplary network architecture 150 in which embodiments of the present invention may operate. The network architecture 150 may include multiple clients such as 154, 156, and 158. A client may be a computing device such as a desktop computer, laptop computer, server, etc., and may be operated by an IT administrator, a software developer or any other user.

Network architecture 150 also includes configuration profile server 165 coupled to the clients 154 through 158 via a network 130 (e.g., a private network such as LAN or a public network such as Internet). The configuration profile server 165 is operable to provide services targeted to, and/or dependent on, specific clients. To provide such services for specific clients, it may be necessary for the specific device to provide identification information to configuration profile server 165. Such identification may be achieved using a UUID (universally unique identifier) or any other identifying data. In one embodiment, the UUID is generated as part of activating and/or configuring an operating system kernel on client 154. Alternatively, generation of the UUID may occur separately from device activation and configuration. The identifier can be generated by the client-side application and transmitted to the server, and/or generated by the server and transmitted to the client-side application (such as when the client-supplied UUID is absent or invalid).

Each client 154 through 158 may include a browser application 186 to allow users to view, and interact with, information on the Internet or local network. In addition, in one embodiment, each client may host one or more modules that may include, for example, a UUID generator 188 and a configuration profiler 190. The configuration profiler 190 is operable to collect information concerning the configuration of the client machine and to submit the profile information to a server. The profile information may specify the kinds of hardware devices (and revision numbers) that are installed within the client. The profile information can optionally include a snapshot of software on the system.

Configuration profile server 165 provides one or more services to clients 154 through 158. In one embodiment, configuration profile server 165 uses the configuration profiler 190 to collect the submitted information concerning the configuration of the clients 154 through 158. The server-side software for the information profile system typically includes a database 184 that is used to track the profile information supplied by the clients 154 through 158. The database 184 can be used to track various types of hardware components of the client, the type of processor of the client system, the type of operating system running, which version of the operating system kernel is running, how much memory is available, and the like.

Configuration profile server 165 may be represented by one or more computing devices such as, for example, a desktop computer, laptop computer, server, etc. In one embodiment, configuration profile server 165 may include client interface 178, web page generator 180, and database engine 182. Client interface 178 handles requests from and provides responses for clients 154 through 158, for example. Web page generator 180 can be used to actively generate web pages in response to communications from clients 154 through 158.

Database engine 182 stores configuration profiles provided by configuration profilers 190 in the database 184. Each configuration profile is associated with a UUID generated by UUID generator 188 in database 184 such that the information can be retrieved for a particular client using the associated UUID.

Clients 154 through 158 can communicate with wiki 190 across the network 130. (A wiki is server software that allows users to create and edit web page content using a web browser.) Wiki 190 can be accessed by a user of a client to store user-specified information related to a configuration profile for the client. Wiki 190 can then be queried by other users to access the user-specified information.

Figure 2:
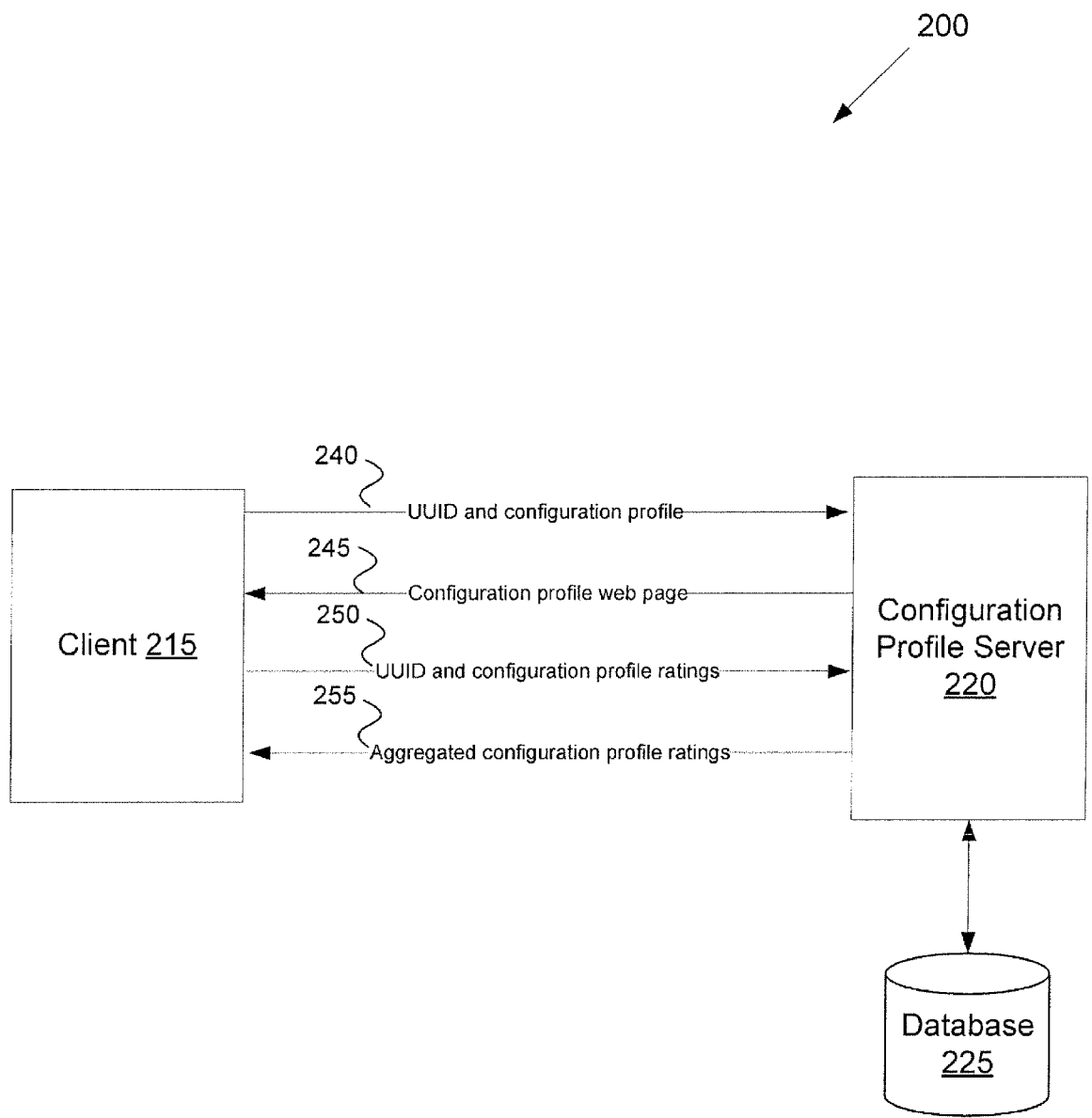
FIG. 2 is a data flow diagram that illustrates data transmitted between a client and a configuration profile server, in accordance with one embodiment of the present invention.

FIG. 2 illustrates a data flow diagram 200 that shows data transmitted between a client 215 and a configuration profile server 220, in accordance with one embodiment of the present invention. Because the profile information is generally insufficient to identify client 215, an insecure channel may be used for transmission of, for example, the profile information.

Referring to FIG. 2, in a first transmission 240, a UUID and configuration profile is transmitted from client 215 to configuration profile server 220. The configuration profile may be generated automatically as a result of, for example, upgrading the operating system on client 215. The UUID (universally unique identifier) can be generated in software (such as the UUID of the operating system kernel) and/or is hardware-based (such as a one-way hash function of the serial number of the microprocessor), for example.

In response to receiving the UUID and the configuration profile from client 215, configuration profile server 220 stores the configuration profile with the associated UUID in database 225. The configuration profile server 220 uses the received configuration profile to generate a configuration profile web page. The generated configuration profile web page contains a user interface by which a user can provide ratings for various items contained within the configuration profile. The configuration profile web page is transmitted to client 215 using second transmission 245.

Client 215 displays the received generated configuration profile web page to a user of client 215. The user can use the generated web page to rate items contained within the configuration profile web page. In transmission 250, the client 215 sends the UUID and configuration profile ratings to the configuration profile server 220.

Configuration profile server 220 receives the configuration profile ratings and stores the configuration profile ratings using the associated UUID in database 225. Thus, the configuration profile ratings are stored with the associated configuration profile. Various configuration profile ratings are received from various clients 215 such that an aggregated database of configuration profiles is created in database 225. Configuration profile server 220 is arranged to generate web pages for querying configuration profile stored in database 225. As described below with further reference to FIG. 4, the web page for querying can be sent to client 215 such that the aggregated configuration profiles can be searched, for example, by device names contained in the configuration profile to expose ratings associated with a particular device.

Figure 3:
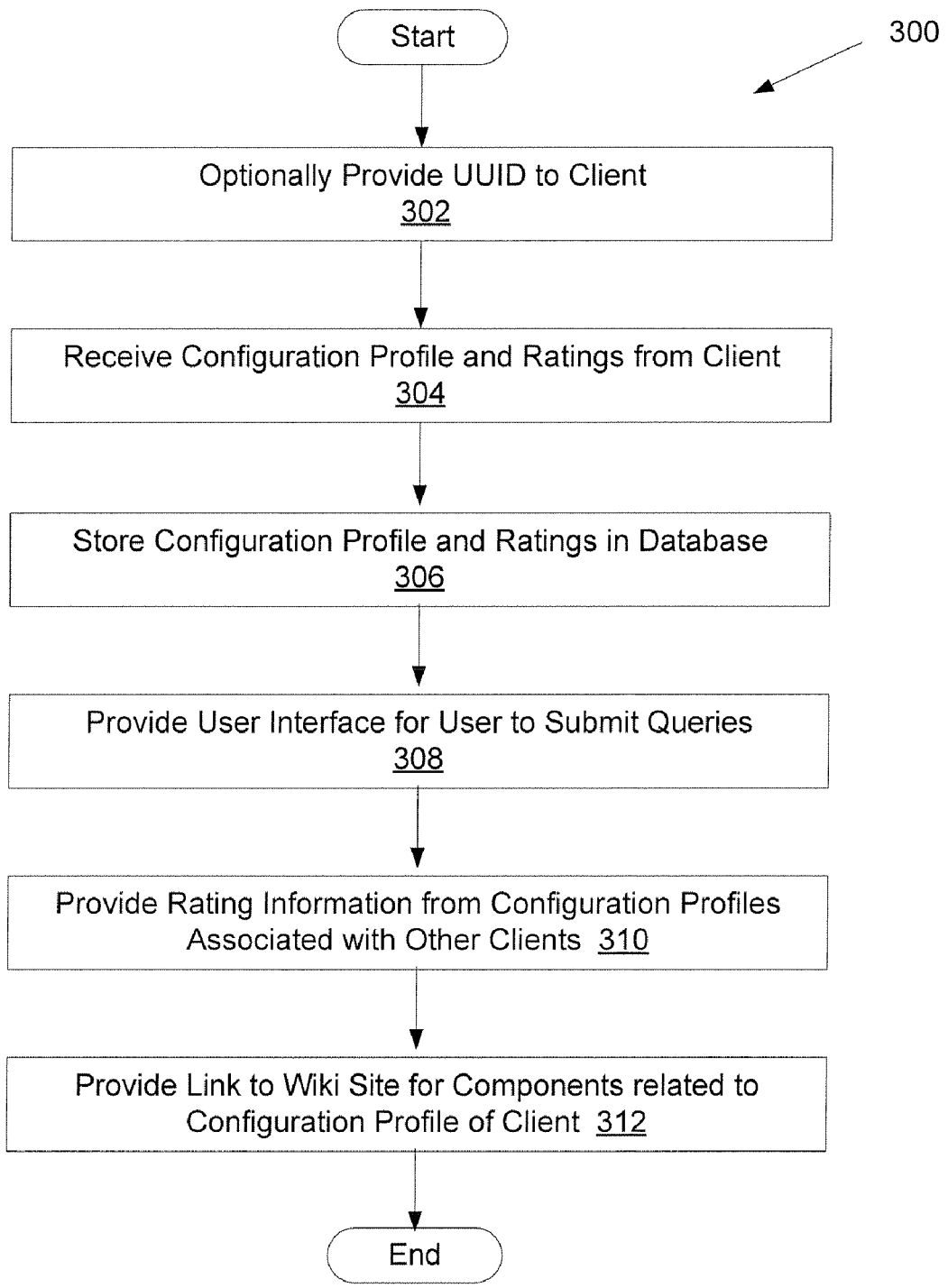
FIG. 3 is a flow diagram illustrating a server-side method for configuration profiling, in accordance with one embodiment of the present invention.

FIG. 3 is a flow diagram illustrating one embodiment of a server-based method 300 for configuration profiling. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a server provider, such as configuration profile server 165 of FIG. 1.

Referring to FIG. 3, method 300 begins at block 302 where a unique identifier (e.g., a UUID) is optionally provided for the client (when the client does not, or fails to, supply a UUID). At block 304, the server receives a configuration profile from the client. The configuration profile typically includes a UUID associated with a client, rating information provided by the user, and information identifying components for which rating information was received. The components may include, for example, hardware components (e.g., a processing device, a memory device, an input/output device, etc.), firmware components (e.g., device drivers, etc.), or software components (e.g., an operating system, software applications, etc.). The ratings information can be provided with the configuration information or supplied in a later communication (in which the client is identified by using the UUID).

At block 306, the server stores the configuration profile with the associated UUID in a database. The database can be used to track various types of hardware components of the client, the type of processor of the client system, the type of operating system running, which version of the operating system kernel is running, how much memory is available, and the like. Each profile (from different clients) is stored in the database individually so that each profile and associated ratings can be later searched. The server stores the configuration profile ratings using the associated UUID in the database such that the configuration profile ratings are associated with the associated configuration profile. Various configuration profile ratings are received from various clients such that an aggregated database of configuration profiles is created in the database.

At block 308, the server generates and provides a user interface for the client to use when submitting queries. For example, the user interface can provide controls that are associated with types of components that are in the configuration profile of the client whose user desires to search the database. In another example, users can use text-based commands to search the database. The profile information (including rating information) from the database can thus be searched by various users.

For example, the profile information can include, all data related to a certain operating system version. In such a case, common problems associated with upgrading to a particular recall operating system version can quickly and easily be identified. Additionally, the data can be sorted by vendor and device identification numbers. The rating information can be aggregated based on the sorting criteria such that, for example, poorly performing equipment can be quickly identified. Likewise, devices (and combinations of devices) that work well can be identified. The information can be tracked over time to provide trending information (such as which devices generally work well, which devices are the most popular and the like) so that developers can focus their attention in areas that provide the greatest impact. Likewise, users (who desire to quickly build high performance systems with a minimum of effort) can determine which devices would provide higher likelihood of working successfully.

At block 312, a link can be provided to the client for quickly accessing wiki sites that pertain to component types identified in the configuration profile of the client. The wiki sites can be further searched and populated by entries by users as described further below.

Figure 4:
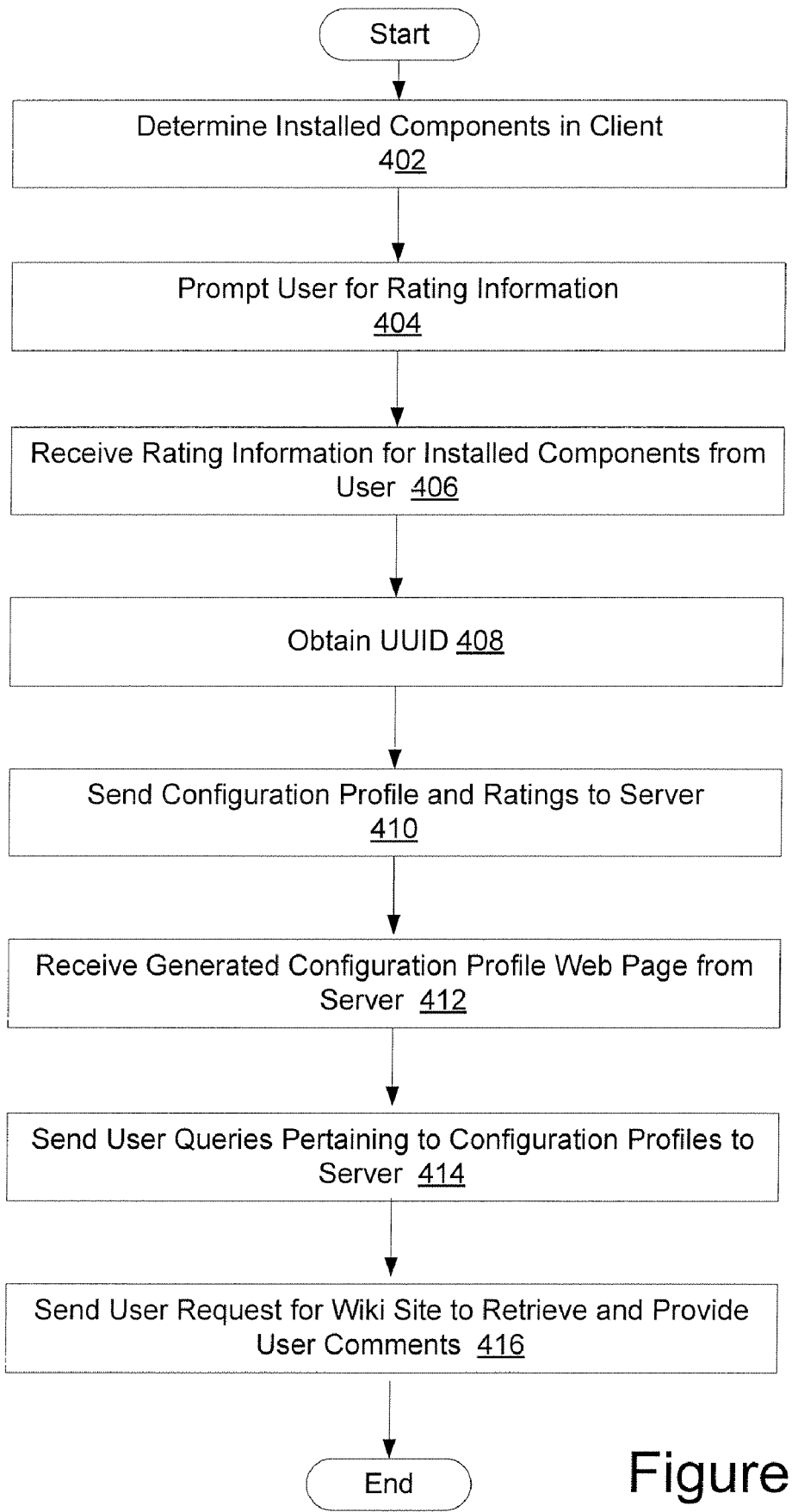
FIG. 4 is a flow diagram illustrating a client-side method for configuration profiling, in accordance with one embodiment of the present invention.

FIG. 4 is a flow diagram illustrating one embodiment of a client-based method 400 for configuration profiling. The method may be performed by processing logic (that can be executed by the computer hosting the configuration database) that may comprise hardware (e.g., circuitry, dedicated logic, programmable logic, microcode, etc.), software (e.g., instructions run on a processing device to perform hardware simulation), or a combination thereof. In one embodiment, the method 400 is performed by a computing device, such as the client device 154 of FIG. 1.

Referring to FIG. 4, method 400 begins at block 402 where the components installed in a client are determined. The process can be initiated, for example, automatically as a result of, for example, upgrading the operating system on the client, for example.

At block 404, the user is prompted for rating information for components identified in block 402. The user display can automatically list the identified components, and provide controls for inputting the rating information. The user can provide a rating information by selecting rating (e.g., radio) buttons (such as "no problems," "runs slow," "works intermittently," "won't work at all," "no updated drivers available," and the like). User can also, for example, select an expert level that displays more information on the generated web page and allows the user to provide more specific input. In one embodiment, the user is prompted for rating information in a user interface generated by the server in response to receiving a list of client components from the client. Alternatively, the client generates a user interface to prompt the user for rating information upon determining which components are installed on the client.

At block 406, the client receives rating information for the installed components from the user. The user can, for example, rate the components by how well the components perform after an operating system upgrade. (Rating the components allows users to query the database on the basis of performance as discussed below).

At block 408, a unique identifier of the client such as a UUID is obtained. The UUID can be generated by the client (or optionally obtained from the server). The UUID can be software based or hardware based.

At block 410, the generated UUID and the configuration profile are sent to the server. The client profile information can include the operating system upgrade number, for example, with a client profile so that problems (big and small) that occur when upgrading to a particular operating system can be tracked.

At block 412, the client receives a generated configuration profile web page that contains a user interface by which a user can view ratings for components contained within the configuration profile. For example, the ratings can be a numerical average (including enumerated datatypes) of ratings received from all clients having a particular type of installed component.

In one embodiment, the configuration profile web page is generated by the server for a client and sent in response to the server receiving the UUID and configuration profile from the client. In another embodiment, the configuration profile web page is generated and sent in response to the client sending the client UUID to the server in response when searching at a later time. At block 414, the client uses the configuration profile web page to submit queries pertaining to configuration profiles stored in the database on the server. Controls and text-input boxes can be used to provide varying levels of flexibility and complexity in searches.

At block 416, the client can request a wiki site for accessing (e.g., reading, writing, and modifying) user-specified information concerning types of devices identified by the configuration profile. The wiki site can be requested, for example, by using a link in the display generated web page. The wiki site can be hosted by the configuration profile server or can be hosted by a different server. Separate wiki links can be provided for individual items in the information profile.

The user can access the wiki to retrieve and provide additional user comments. When a user selects a link to a wiki for a particular device in the displayed profile, the client browser is vectored by the link to a wiki page that is related to the device. The user can be prompted to modify the wiki by providing information related to the device. For example, the user can input: "When I upgraded to the 8.X revision of such-and-such operating system, the device wouldn't work, so I went to the manufacturer's web site and downloaded version 4.X of the drivers and haven't had any problems since." Because of user and component provider inputs to the wiki, users can quickly find solutions for their configuration problems. Likewise, component providers can quickly gather important customer feedback so as to quickly resolve problems and provide solutions.

Figure 5:
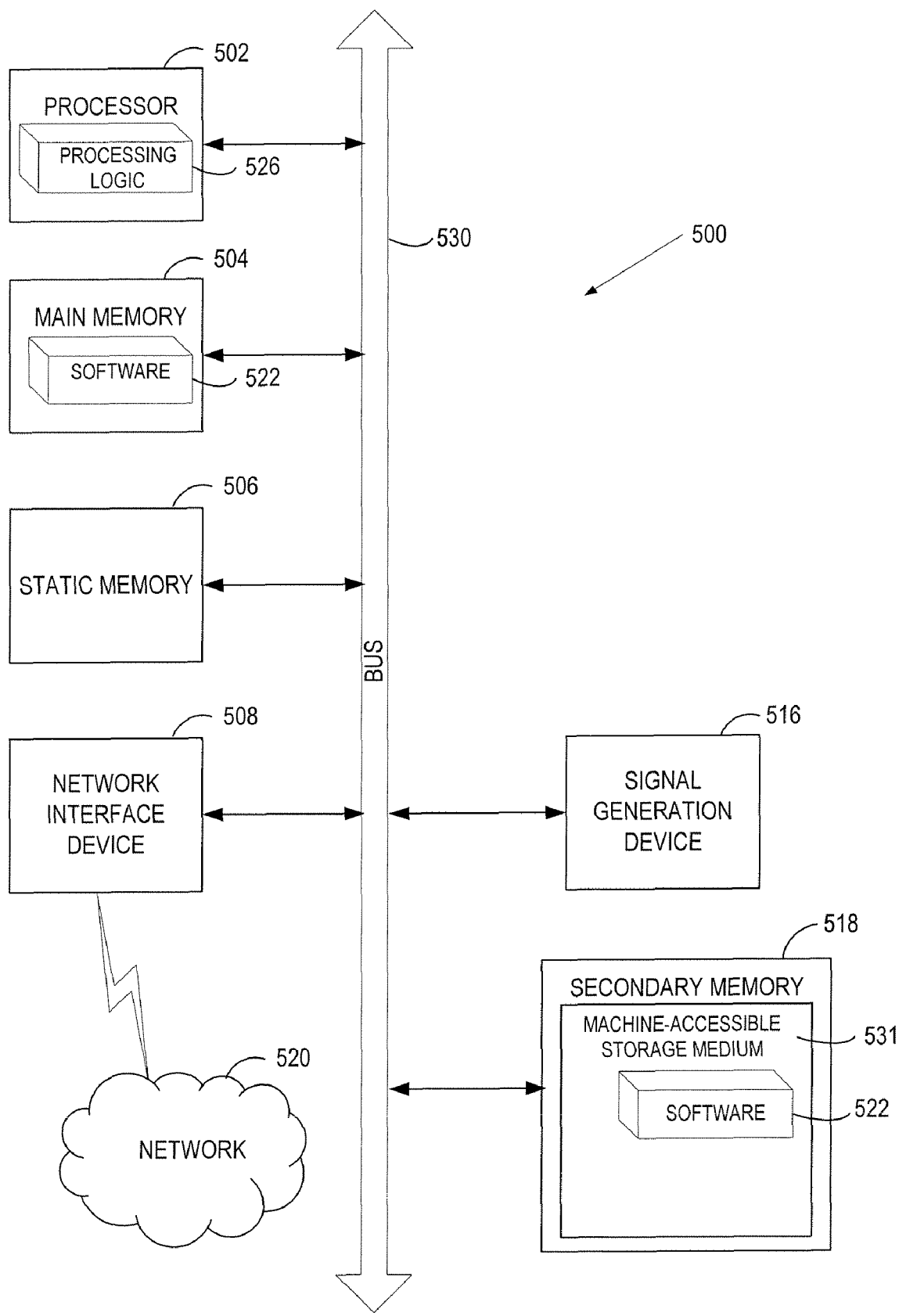
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a first server 115, a second server 125, a client 110, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A client computing system implemented method, comprising:

determining, by the client computing system, a plurality of components that are installed in the client computing system, the client computing system being associated with a unique identifier;

generating, by the client computing system, a configuration profile comprising the plurality of components that are installed in the client computing system and the unique identifier, and sending the configuration profile to a server in a first transmission;

receiving, by the client computing system, a configuration profile user interface from the server in a second transmission in response to sending the configuration profile to the server, the configuration profile user interface comprising a list of the plurality of components that are installed in the client computing system that is associated with the unique identifier and controls for inputting the rating information;

receiving, by the client computing system, the rating information for the installed components in the displayed list via the configuration profile user interface;

providing, by the client computing system to the server, the rating information provided by the user, and information specifying components for which rating information was received; and in response to providing the configuration profile, receiving, by the client computing system from the server, rating information provided by other users having components in common with the components identified in the configuration profile.

2. The method of claim 1, further comprising generating the unique identifier as a universally unique identifier (UUID).

3. The method of claim 2 wherein the UUID is generated using a serial number of an operating system kernel.

4. The method of claim 2, wherein the UUID is generated using a one-way hash function of a serial number of a hardware component installed in the computer.

5. The method of claim 1, further comprising, in response to providing the configuration profile, receiving a link to a wiki site having user-supplied information for components in common with the components identified in the configuration profile.

6. The method of claim 1, further comprising:

receiving a user interface page facilitating user input of queries concerning rating information for the components identified in the configuration profile;

sending queries provided by the user via the user interface page to the server; and receiving, from the server, responses to the queries.

7. The method of claim 1, wherein the prompting a user for rating information is performed in response to an upgrading of an operating system of the computer system.

8. A computer implemented method, comprising:

receiving, by a server computing system, from a client computer that is associated with a unique identifier, configuration profile information including a list of components that are installed in the client computer;

generating, by the server computing system, a configuration profile user interface based on the list of components that are installed in the client computer;

sending, by the server computing system, the configuration profile user interface to the client computer, the configuration profile user interface comprising the list of the components that are installed in the client computer that is associated with the unique identifier and controls for inputting rating information to prompt a user for rating information for the installed components;

receiving the rating information provided by the user of the client computer for the components installed in the client computer, and information identifying client computer components for which rating information was provided;

storing the received configuration profile information and rating information in a database that includes configuration profiles associated with other client computers;

providing a user interface to the client computer to allow the user of the client computer to submit queries pertaining to configuration profiles stored in the database; and in response to user queries, providing, to the client computer, rating information from configuration profiles associated with other client computers, the provided rating information being related to components identified in the configuration profile information received from the client computer.

9. The method of claim 8, further comprising providing a link to a wiki site related to a component for which a client rating has been received.

10. The method of claim 8, further comprising generating the unique identifier as a universally unique identifier (UUID) for the client computer.

11. The method of claim 10, further comprising storing a revision level of an operating system of the client.

12. The method of claim 11, wherein the user interface page is populated with names of the components installed in the computer, wherein each component name is associated with rating information from other client computers for the named component.

13. A non-transitory machine-accessible medium including instructions that, when executed by a first machine, cause the first machine to perform a computer implemented method comprising:

determining a plurality of components that are installed in a computer system, the computer system being associated with a unique identifier;

generating, by the client computing system, a configuration profile comprising the plurality of components that are installed in the client computing system and the unique identifier, and sending the configuration profile to a server in a first transmission;

receiving, by the client computing system, a configuration profile user interface from the server in a second transmission in response to sending the configuration profile to the server, the configuration profile user interface comprising a list of the plurality of components that are installed in the computer system that is associated with the unique identifier and controls for inputting the rating information;

receiving the rating information provided by the user for the installed components in the displayed list;

providing, to a server, the rating information provided by the user, and information identifying components for which rating information was received; and in response to providing the configuration profile, receiving, from the server, rating information provided by other users having components in common with the components identified in the configuration profile.

14. The non-transitory machine-accessible medium of claim 13, wherein the method further comprises:

receiving a user interface page facilitating user input of queries concerning rating information for the components identified in the configuration profile;

sending queries provided by the user via the user interface page to the server; and receiving, from the server, responses to the queries.

15. The non-transitory machine-accessible medium of claim 13, wherein the method further comprises generating the unique identifier as a universally unique identifier (UUID).

16. The non-transitory machine-accessible medium of claim 13, wherein method further comprises generating a snapshot of software on the first machine.

17. The non-transitory machine-accessible medium of claim 13, wherein the method further comprises including firmware information of the first machine in the configuration profile.

18. The non-transitory machine-accessible medium of claim 13, wherein the method further comprises including driver information for a component listed in the configuration profile.

19. An apparatus, comprising:
a client interface to receive, from a client computer that is associated with a unique identifier, configuration profile information including a list of components that are installed in the client computer and rating information provided by a user of the client computer for the components installed in the client computer, and information identifying client computer components for which rating information was provided;
a database, coupled to the client interface, to store the received configuration profile, the database including configuration profiles associated with other client computers; and
a web page generator, coupled to the database, to generate a configuration profile user interface based on the list of components that are installed in the client computer, and to send the configuration profile user interface to the client computer, the configuration profile user interface comprising the list of the components that are installed in the computer system that is associated with the unique identifier and controls for inputting the rating information to prompt the user for the rating information for the installed components and to provide a user interface to allow the user of the client computer to submit queries pertaining to configuration profiles stored in the database, and to respond to user queries received from the client computer by providing rating information from configuration profiles associated with other client computers, the provided rating information being related to components identified in the configuration profile received from the client computer.

20. The apparatus of claim 19, wherein the client interface is further configured to generate the unique identifier as a universally unique identifier (UUID) when the client supplied UUID is invalid or absent.

21. The apparatus of claim 19, wherein the provided rating information is associated with a link to a wiki site for components related to the provided rating information.

22. The apparatus of claim 19, further comprising a database engine to query the database using the type and revision of operating system as query terms.

* * * * *